March 26, 1968  R. E. SEAMANDS ET AL  3,375,000
BELLEVILLE SPRING ASSEMBLY

Filed Jan. 4, 1966  2 Sheets-Sheet 1

INVENTORS
ROBERT E. SEAMANDS
JIMMY H. WILLIAMS
BY
Harry M. Saragovitz, Edward J. Kelly,
Herbert Berl, & Albert E. Arnold Jr.

ATTORNEYS

March 26, 1968  R. E. SEAMANDS ET AL  3,375,000
BELLEVILLE SPRING ASSEMBLY
Filed Jan. 4, 1966  2 Sheets-Sheet 2

INVENTORS
ROBERT E. SEAMANDS
JIMMY H. WILLIAMS
BY
Harry M. Saragovitz, Edward J. Kelly,
Herbert Berl, & Albert E. Arnold

ATTORNEYS

United States Patent Office 3,375,000
Patented Mar. 26, 1968

3,375,000
BELLEVILLE SPRING ASSEMBLY
Robert E. Seamands, Moline, Ill., and Jimmy H. Williams, Bettendorf, Iowa, assignors to the United States of America as represented by the Secretary of the Army
Filed Jan. 4, 1966, Ser. No. 518,746
6 Claims. (Cl. 267—1)

ABSTRACT OF THE DISCLOSURE

An improved Belleville spring assembly is provided for a plurality of discs mounted in parallel, stacked array by disposing a bearing element between the inner and outer edges of adjacent discs thereby to reduce surface friction between the discs.

---

The present invention relates to Belleville springs of the type disclosed in United States Letters Patent No. 75,970 to Belleville, and more particularly to an improved structure for Belleville springs, wherein the discs are used in a parallel arrangement.

The advantages of using Belleville springs stacked in concentric, parallel relation are well known and recognized, for example, in the United States Letters Patent No. 3,029,071 to J. W. Wells. However, the abutting relation of the washers disclosed by this patent, as well as other arrangements, will be found to produce relatively high, undesirable, hysteresis losses as a consequence of the friction imposed by contacting surfaces through flexure of the washers and associated parts. This, of course, is objectionable for some applications since it severely limits the usefulness of these springs in spite of the advantages they offer in their ability to develop a very high spring force in a restricted diameter. Typically, this hysteresis loss is capable of effecting as much as 40 percent loss in energy.

Accordingly, it is a primary object of the present invention to provide an improved Belleville spring which will overcome inherent disadvantages incident to hysteresis losses.

It is also an object of the present invention to provide an improved structure for Belleville spring assemblies which will be more efficient and relatively friction free.

A further object of the present invention is to provide an improved arrangement for frusto-conical springs disposed in parallel, stacked array which will enhance the effectiveness of such springs.

Still another object of the present invention is to provide an improved arrangement for Bellevillie springs which is given to ease of assembly, yet it is relatively inexpensive to manufacture and highly effective and efficient in use.

In accordance with the present invention, an improved Belleville spring assembly is provided by disposing a bearing element between respective inner and outer edges of adjacent discs which are mounted in parallel, stacked array.

The novel features characteristic of the present invention, as well as additional objects and advantages thereof, will be understood better from the following detailed description when read in connection with the accompanying drawings in which.

Figure 1:
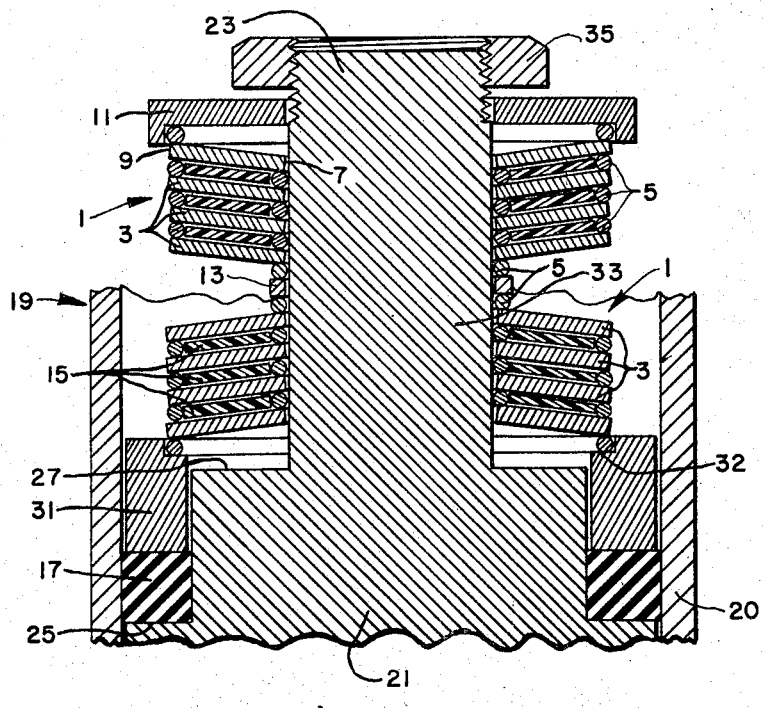
FIGURE 1 is a central longitudinal section of a Belleville spring assembly in accordance with one embodiment of the present invention, the parts being shown assembled prior to loading.

Referring more particularly to the drawing, wherein similar reference characters are used to designate corresponding parts throughout, the present invention is shown, by way of example, applied in a parallel, series arrangement to provide a constant preload for a seal ring independent of seal wear or expansion. Thus, a constant force device is provided to prevent leakage.

For application to such a use, as that mentioned above, a Belleville type spring assembly is particularly suitable. Although a constant force can be obtained by a single Belleville spring disc, in most cases, the loads produced thereby are too low. For such cases, a series-parallel stack is desirable if motion requirements demand such an arrangement. In such case, the arrangement shown by the two embodiments herein will be found suitable.

Figure 2:
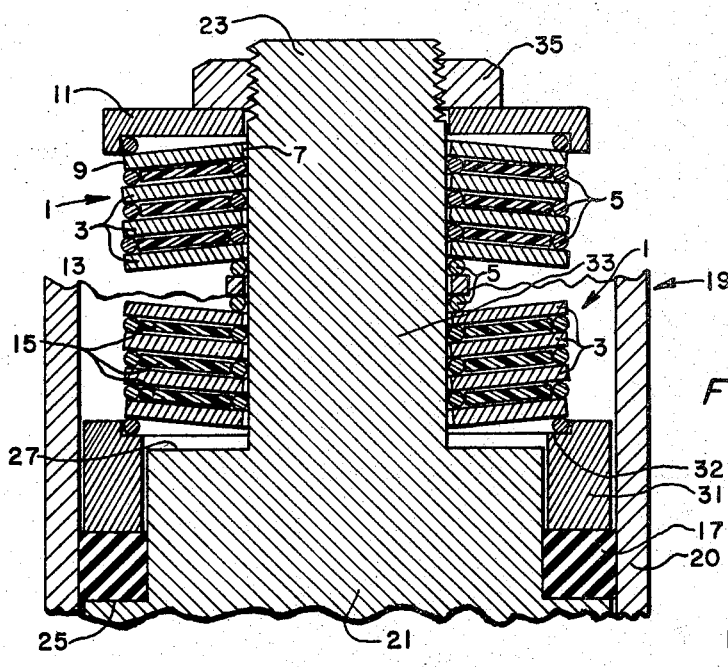
FIGURE 2 is a view of the spring assembly shown in FIGURE 1, the parts being shown under load condition.
Figure 3:
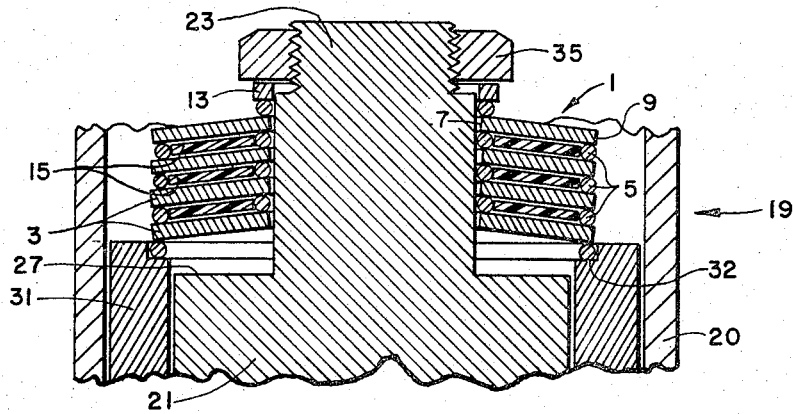
FIGURE 3 is a view similar to FIGURE 1 of a second embodiment of the present invention, the parts being shown assembled prior to loading.
Figure 4:
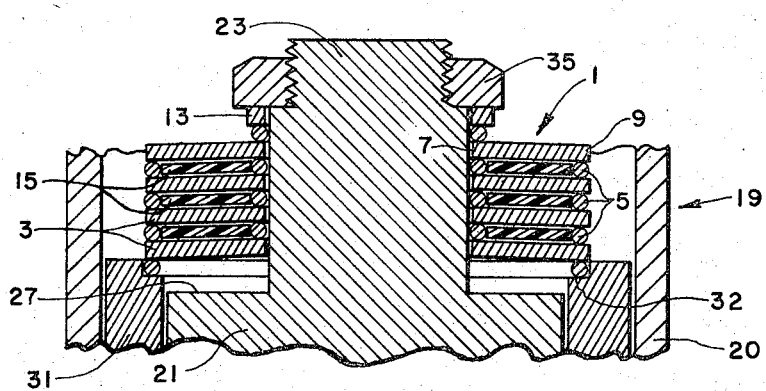
FIGURE 4 is a view of the spring assembly shown in FIGURE 3, the parts being shown under load condition.

In FIGURES 1 and 2 of the drawings, the embodiment utilizes two sets 1 of parallel stacked springs disposed in series relation thereby increasing the allowable deflection over a single, parallel stack, as shown by FIGURES 3 and 4. Each set of springs comprises a composite spring formed of a plurality of frusto-conical discs 3 which are made from thin spring strip material of parametric design well known in the art. In order to minimize hysteresis loss incident to sliding friction between the faces of abutting discs, bearing elements 5 are provided adjacent to the inner 7 and outer 9 peripheries of the discs. The bearing elements are disposed not only between adjacent discs, but also between the disc outer periphery at the base of the stack and the adjacent pressure member or collar 11, 31, as well as between the disc inner periphery at the apex of each stack and an annular spacer member 13 disposed between the two sets of springs. The spacer member 13 also functions to transmit pressure as between the two sets of springs.

The bearing elements 5 comprise toroidal or ring-like members which need only be large enough in cross section to resist crushing and yet be small enough to exert negligible influence on the load deflection characteristics of the spring. For example, the spring arrangement shown in FIGURES 1 and 2 employs two sets of parallel stacked springs with four discs per set. If the discs are of 3 inches outside diameter, 2.055 inches inside diamter, .062 inch thickness, and .094 inch height, a .030 inch diameter wire bearing ring will be found to be suitable. The bearing material which has been found to be appropriate for such an application is hardened steel music wire which was found to function successfully in transmitting a maximum test load of 5000 pounds. Tests indicated a reduction from a 40 percent hysteresis loss for unlubricated springs to approximately 4 percent as contrasted with a reduction to approximately 15 to 20 percent in springs provided with a dry film lubricant.

The use of a spacer member 15 to maintain the bearing members 5 in position is not essential. However, for some applications, an annular spacer may be utilized for this purpose as shown in the drawings. The spacer is disposed between the inner and outer bearing members and in the space between adjacent discs. Any suitable material may be used for the spacer such as rubber or plastic.

Although the present invention is applicable to many uses, for purpose of illustration, it is shown, in FIGURES 1 and 2 of the drawings, applied in a parallel-series arrangement to provide a preload for a seal member 17. In an application of this type, it will be understood that, for effective sealing, the interface pressure between the seal element and the cylinder wall must exceed the pressure of the fluid being sealed. If interface pressures are less than the pressure of the fluid being sealed, the tendency is to induce leakage while excessive pressure increases wear. Therefore, it is desirable to preload the seal with a constant force device such as that disclosed by the present invention. In FIGURES 1 and 2, the constant force device 19 comprises a cylinder 20 within which fluid (not shown) is disposed. A piston 21 is mounted within the cylinder walls, the outer end of 23 which is reduced in diameter to provide at least two steps 25, 27.

The annular seal 17 is made from a suitable elastic material and is disposed about the piston against the shoulder 25 for contact with the walls of the cylinder. An annular pressure collar 31 is slidably disposed about the piston for axial displacement therewith and for engagement with the seal. The pressure collar extends beyond the other step 27 for engagement with the Belleville spring assembly mounted on the free end of the piston. The inner periphery of the pressure collar is cut away to provide a shoulder 32 for receiving and containing the Belleville spring assembly. The Belleville spring assembly is slidably mounted on the extension 33 of the piston, the outer end 23 of which is threaded to receive a nut 35 for application of pressure against the collar or pressure member 11 thereby to load the spring assembly.

Although the preferred arrangement of the present invention, as shown by FIGURES 1 and 2 of the drawings, utilizes two sets of Belleville springs disposed with the apexes of the discs extending toward each other, thereby disposing the two sets in a series relation, another embodiment contemplates the use of one set of Belleville springs, as shown in FIGURES 3 and 4.

Figure 5:
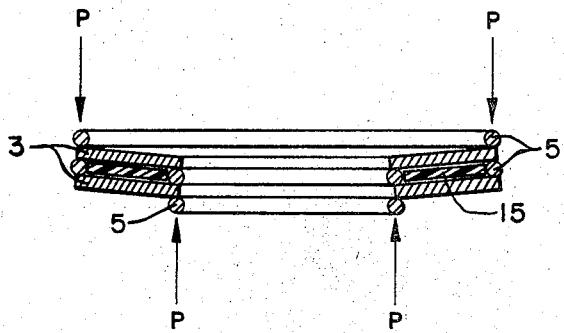
FIGURE 5 is a schematic view to illustrate the application of pressure to the spring discs.

In operation, the sets of Belleville springs are loaded by application of pressure simultaneously to both the inner periphery at the apex end of the stack and application of opposing pressure to the base or outer periphery at the opposite side of the stack, in the manner indicated by the arrows P shown in FIGURE 5 of the drawings. As a consequence of loading the discs, the bearing members 5 installed between adjacent discs 3 permit relative friction free motion therebetween by a rolling action thereby minimizing hysteresis losses. This rolling action causes the bearing elements to function in like manner to a roller bearing.

Accordingly, it will be recognized by persons skilled in the art that the present invention provides a highly efficient, low hysteresis loss for Belleville type springs. Although the present invention has been shown and described with respect to two embodiments, it will also be apparent that other embodiments, as well as modifications of those disclosed, may be made without departing from the spirit or scope of the invention. Therefore, it is desired that the particular forms of the present invention shown and described herein should be considered at illustrative and not as limiting.

What is claimed is:

1. A spring assembly comprising a plurality of flexible frusto-conical washers, said washers being disposed in coaxial, parallel, stacked array, and bearing means disposed between adjacent washers and adjacent to both the inner and outer peripheries thereof, each of said bearing means comprising a toroidal member of flexible material capable of rotation about its own axis.

2. The invention as defined in claim 1 wherein said bearing means flexible material comprises a metal having a parameter sufficient to resist crushing and yet exert negligible influence on the load deflection characteristics of said spring assembly.

3. The invention as defined in claim 2 wherein an annular spacer is disposed between respective inner and outer bearing means.

4. The invention as defined in claim 2 and wherein said spring assembly includes means for maintaining said washers in stacked array, said maintaining means including means for applying pressure to the inner and outer peripheries respectively to the opposite sides of the washer stack thereby to deflect said washers in the process of loading said spring assembly.

5. The invention as defined in claim 3 wherein two groups of said frusto-conical washers are coaxially disposed, the respective concave surfaces of each group being disposed in opposite directions.

6. The invention as defined in claim 5 and wherein said spring assembly includes means for maintaining said washers in stacked array, said maintaining means including means for applying pressure to the inner and outer peripheries respectively on opposite sides of each washer stack group thereby to deflect said washers in the process of loading said spring assembly.

References Cited

UNITED STATES PATENTS

| | | |
|---|---|---|
| 2,162,719 | 6/1939 | Hay. |
| 2,973,015 | 2/1961 | Thompson. |
| 3,107,905 | 10/1963 | Lucas. |
| 3,313,567 | 4/1967 | Sturman. |

FOREIGN PATENTS

| | | |
|---|---|---|
| 223,591 | 12/1942 | Switzerland. |

ARTHUR L. LA POINT, *Primary Examiner.*

R. M. WOHLFARTH, *Assistant Examiner.*